I. W. GRUHL.
SIGNALING DEVICE.
APPLICATION FILED FEB. 11, 1918.

1,327,818.

Patented Jan. 13, 1920.
2 SHEETS—SHEET 1.

Inventor
Irvin W. Gruhl
By William N. Kirkby
Atty.

I. W. GRUHL.
SIGNALING DEVICE.
APPLICATION FILED FEB. 11, 1918.
1,327,818.
Patented Jan. 13, 1920.
2 SHEETS—SHEET 2.
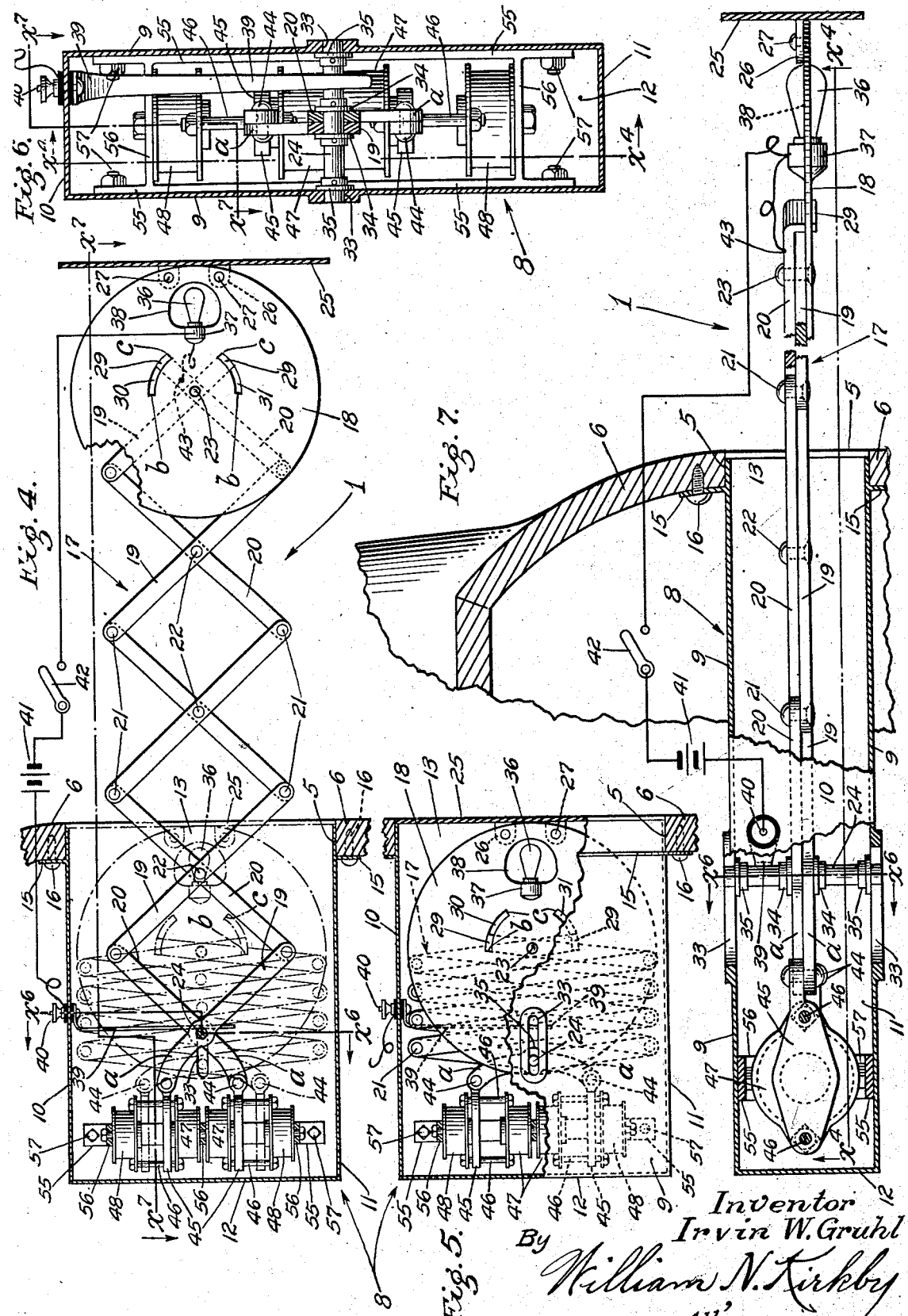
Inventor
Irvin W. Gruhl
By William N. Kirkby
Atty.

UNITED STATES PATENT OFFICE.

IRVIN W. GRUHL, OF LOS ANGELES, CALIFORNIA.

SIGNALING DEVICE.

1,327,818.   Specification of Letters Patent.   Patented Jan. 13, 1920.

Application filed February 11, 1918. Serial No. 216,625.

*To all whom it may concern:*

Be it known that I, IRVIN W. GRUHL, a citizen of the United States, residing at Los Angeles, in the county of Los Angeles and State of California, have invented a new and useful Signaling Device, of which the following is a specification.

My invention relates to a signaling device for use primarily in the automobile traffic, though it may readily be adapted in connection with other forms of conveyance.

Collisions and accidents often occur due to misunderstanding between drivers passing in the same or opposite directions, and in crowded centers considerable danger arises from the uncertainty attendant upon the movements of approaching and receding vehicles. Much of this danger could be eliminated by providing the vehicles with visual signals showing the intended movement of the vehicle, that is, whether the driver will turn his vehicle to the right or to the left, or will slow it down preparatory to stopping.

It is the object of this invention, first, to provide simple, quick and efficient signal means by which the driver may make known his intentions in the above respects. Second, to provide a compact form of signal means that may be built into the motor car by the manufacturer and concealed from view when not in signaling commission, thus to retain the graceful lines, beauty and neat appearance of the car body.

Broadly considered the invention comprises signal arms concealed within the motor car body and adapted to project out, one from either or both sides thereof, into extended signaling position to indicate the intended movement of the car. Said arms are preferably of a foldable nature and may be operated either manually or by electrical means, the latter being shown and described in the present instance.

Other objects and advantages may appear from the subjoined detailed description together with the appended claims.

The accompanying drawings illustrate the invention.

Fig. 4 is a detail sectional elevation viewed from line $x^4$, Figs. 6 and 7, showing a signal arm mounted in position in its casing. Solid lines show the arm extended into signaling position and dot-and-dash lines indicate the arm retracted within the casing.

Fig. 5 is a similar view showing the arm retracted and concealed within the casing, a portion of which is shown in outside elevation.

Fig. 6 is an enlarged vertical cross-section on line $x^6$, Figs. 4 and 7.

Fig. 7 is an enlarged plan section viewed from irregular line $x^7$, Figs. 4 and 6, showing parts in an extended signaling position corresponding to solid lines of Fig. 4. A portion of the arm is broken away to contract the view.

Arrows on the various section lines indicate the direction of sight.

Figure 1:
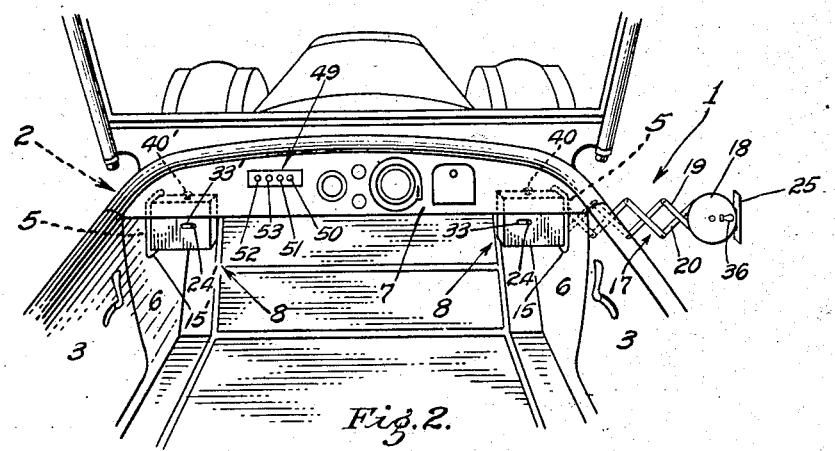
Figure 1 is a fragmental perspective view showing a signaling apparatus embodied by this invention as applied to a motor car, the right hand signal being extended to indicate a comtemplated turn of the car to the right.
Figure 2:
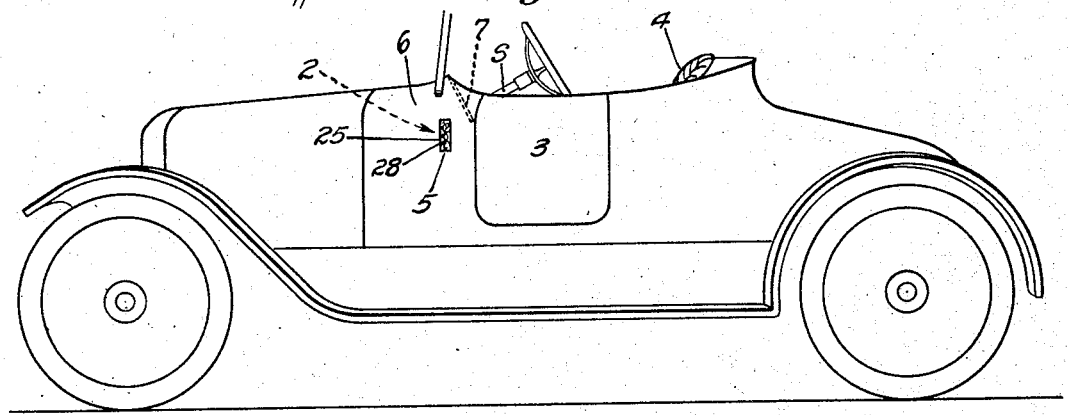
Fig. 2 is a side elevation from the left of Fig. 1, showing a closure plate in position to conceal the left hand signal arm from view.

As seen from Figs. 1 and 2 my signaling device comprises two arms 1, 2, of a foldable nature that are mounted one upon each side of the car and are adapted to disappear from view within the car body when not in signaling use. Said foldable arms are oppositely arranged and may be positioned to extend out from the side doors 3 or rearwardly of said doors so as to disappear behind or under the seat 4. In the present instance, however, said arms are arranged to extend out through an aperture 5 in the cowl 6 just forwardly of the inclined dashboard 7, there being a casing 8 extending inwardly from and communicating with the cowl aperture 5 to thus form a recess or housing for each arm when in its folded position. Each casing may be of any desirable form and shape to suit the type of signal arm used and in the form shown is bounded by side walls 9, top and bottom walls 10, 11, respectively, and an end wall 12, the mouth 13 opposite said end wall being open and adapted to register with the cowl aperture 5. An encircling flange 15 at said mouth 13 serves to hold the casing in place against the inside of the cowl 6, there being screws 16 passing through the flange and into the body of said cowl.

The foldable signal arms may be of a telescopic nature or otherwise variously constructed, and in the instance shown, each arm comprises a lazy tongs frame 17 carrying a suitable indicator 18, said frame being adapted to expand and contract to respectively thrust the indicator out from the casing 8 into signaling position and to retract the same into concealment within the casing. The frame levers 19, 20, forming similar pairs, are connected together at their extremities by pivots 21 and at their centers by pivots 22, the outer terminal center pivot 23 also serving to mount the indicator disk 18 while the inner terminal pivot 24 serves as an actuating knee pivot. Force applied to the knee pivot through the short terminal actuating lever arms $a$ serves to move the levers 19, 20 toward or from one another to respectively retract or extend the signal arm.

Suitable closure means are provided to fit over each of the cowl apertures 5 when the respective arms 1, 2, are folded up within their casings to thus conceal each arm together with its indicator disk entirely from view, which means consists of a closure plate 25 conforming in shape to and being of the same size as the aperture. Said closure plate is secured to the indicator disk 18 at substantially right angles thereto, there being lugs 26 on the plate for this purpose that are riveted at 27 to the edge of the disk. The arrangement of parts is such that when the indicator 18 is in retracted position within the casing 8 the closure plate 25 will fit snugly into the cowl aperture 5, its outer surface being flush with and conforming to the body lines of the car. A decorative effect may be attained by placing a monogram 28 (see Fig. 2) upon the outer surface of the closure plate so that when said plate is in place with the signal arm retracted within the recess the plate presents the appearance of an outlined monogram upon the side of the car.

To firmly mount the indicator disk 18 upon the outer end of the lazy tongs frame and at the same time permit free movement of the outer terminal levers 19, 20, relative to the disk 18 during expansion and contraction of the frame, I have terminated each of said terminal levers 19, 20 in fingers or bent-over tips 29 that are positioned in oppositely arranged circular slots 30, 31 in the disk. Said slots are concentric with the disk pivot 23 so that as the operating levers move toward and from one another the tips 29 move around in said slots. Each tip is adapted to abut against the rear shoulder $b$ of its respective slot when the signal arm is in retracted position within the casing, so that should the disk shift about its pivot 23 during retracting movement of the arm and thus turn the closure plate 25 out of alining position, the action of the tips 29 in engaging with the shoulders $b$ upon completion of said movement will insure the closure plate turning into vertical alinement with the aperture 5 before fitting into it to close the same. Correspondingly each tip abuts against the front shoulders $c$ when the arm is in extended positon to thus hold the disk and closure plate in proper position.

Guide means are provided to hold the frame arm 17 in proper horizontal alinement with its casing during the back-and-forth movement thereof and in the present instance comprises the knee pivot pin 24 of the actuating lever arms $a$, said pivot pin extending across transversely of the casing with its ends running in longitudinal guideways 33 formed one in each of the side walls 9 of the casing. Sets of retaining washers may be pinned or otherwise suitably fastened to the knee pivot pin 24 to form shoulders 34 and 35, the shoulders 34 being positioned one at each side of the lever arm 17 to prevent relative lateral movement between the knee pin and arm, and the shoulders 35 being positioned adjacent the side walls 9 to prevent relative lateral movement between said pin and casing. With this arrangement the pin 24 will run in the side guide-ways 33 during the back-and-forth movement of the arm from and to the casing and hold said arm from drooping as well as to prevent any lateral play thereof. By this means the closure plate 23 will always come into proper register with the aperture 5 to close the same upon retraction of the arm.

For operating with the signal arms at night it is essential that means be provided to illuminate each indicator disk 18 when out in signaling position and accordingly electric lamps 36 are suitably located relative to the disks, there being in the instance shown a socket 37 arranged in each disk edgewise thereof and positioned adjacent an opening 38 that will accommodate the lamp when seated in place in the socket. Said lamp is located intermediate the closure plate 25 and disk pivot 23 so as not to be in the way of the levers 19, 20. A circuit breaker in the form of a depending spring finger 39 projecting into the path of the knee pin 24 is interposed in the lamp circuit and is electrically connected through bindng post 40, battery 41 and switch 42 with the lamp, the other terminal of which is grounded at 43. The lamp circuit is opened and closed through the medium of the circuit breaker 39, being operated to close the circuit as the knee pin 24 contacts therewith upon completion of the arm extending movement to thus light the lamp 36 and illuminate the indicator disk when out in its signaling position, and being operated to open the circuit upon withdrawal of the knee pin therefrom as the arm starts upon its retraction movement thus to put the lamp out. In case of day-time operation of the signal arms the switch 42 is opened to thus cut the lamps 36 out of circuit, said switch controlling the lamp circuits for both arms as seen by Fig. 3.

The signal arms are preferably operated by suitable electrical means and for this purpose the actuating arms *a* of the lever frame are pivoted at 44 to oppositely arranged armatures 45 that are each slidably mounted upon guides 46 and arranged to operate between respective pairs of electro-magnets 47, 48, the inner magnets 47 of each pair being connected together and energized to attract the armatures 45 and extend the lever frame, and the outer magnets 48 being connected together and energized to attract the armatures and retract said frame. The electro-magnets for each signal arm are shown included in separate magnetic circuits (see Fig. 3) controlled by a switch block 49 having switch buttons 50, 51 for the right hand signal arm and buttons 52, 53 for the left hand signal arm.

Referring to Fig. 1 the switch block 49 is seen mounted upon the dash board 7 together with the other dash control accessories, but it is understood that said switch block may be mounted upon the steering standard *s*, (see Fig. 2) or otherwise appropriately positioned. Said switches are of ordinary construction and in the arrangement shown one button of each pair is pressed to thrust out the corresponding signal arm as indicating the intended change of movement, the other being pressed to retract said arm into its concealed position within the recess 8.

Figure 3:
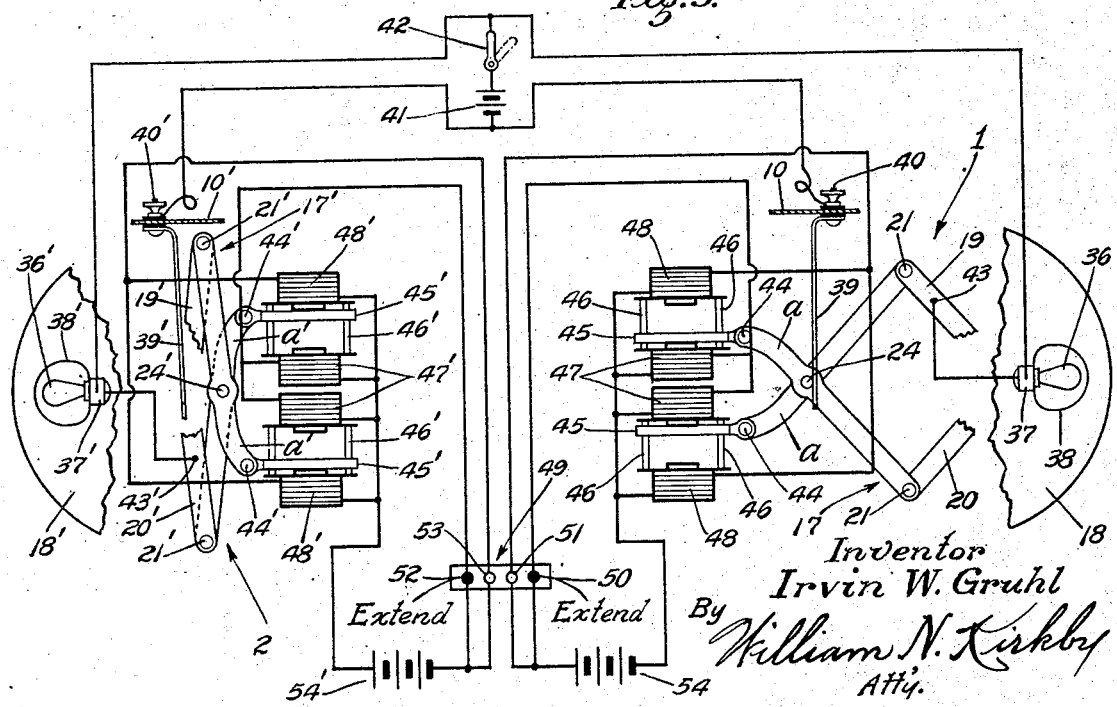
Fig. 3 is a diagrammatic wiring plan indicating the right hand signal extended as in Fig. 1.

The detail Figs. 4, 5, 6 and 7 illustrate the right hand signaling arm and similar parts of the left hand arm, shown in Figs. 1 and 3, are indicated by similar reference characters with the additions of indices.

Batteries 54, 54' are shown as an operating power source but a generator or any other current producer may be substituted.

The electro-magnets are preferably mounted upon a supporting rack comprising side pieces 55 and cross pieces 56, said rack together with the assembled magnets, armatures and lazy tongs frame may be slipped into the casing through the mouth 13 thereof and secured in place to the casing by bolts 57 passing through the side pieces 55. By this mode of assemblage the operating parts are readily removed from the casing for inspection, etc.

In practical daytime operation when the driver wishes to indicate his intention of turning his vehicle to the right he operates switch button 50, thereby extending the foldable arm 1 upon the right hand side of the vehicle to thrust out the indicator disk 18 and thus signal to vehicles or pedestrians both behind and in front. Similarly if the driver desires to signal his intention of turning to the left he operates switch button 52 so as to extend the arm 2 upon the left hand side of the vehicle to throw out the indicator disk. To signal his intention of stopping both of said buttons may be operated to simultaneously throw out both arms and their indicator disks.

In case of night-time operation the driver closes the switch 42 of the lamp circuit, as in solid lines in Fig. 3, whereupon the electric lamps 36, 36' on the indicator disks are lighted to illuminate the respective disks when the same are out in signaling position as hereinbefore described.

In order that my signaling device shall be more readily intelligible the indicator disks may be given different standard and characteristic colors, universally adopted and understood by all drivers.

I claim:—

1. In combination, a motor car provided with a recess at each side of the body thereof, a lever frame adapted to fold into said recess, pairs of electro-magnets mounted within said recess, armatures operatably positioned between the magnets of said pairs and connected with the two terminal levers of the frame, said magnets being adapted to attract the armatures to thus extend and retract the frame.

2. In combination, a motor car provided with an aperture at each side of the body thereof, a casing extending inwardly from and communicating with said aperture, a foldable lazy tongs frame mounted in the casing and adapted to extend through the aperture into signaling position, pivots connecting the levers of said frame together at their centers, an indicator disk carried by the outer terminal pivot and provided with oppositely arranged slots formed concentric to said terminal pivot, a closure plate secured to said disk at the outer edge thereof and adapted to close the aperture when the frame is folded within the recess, the outer terminal levers of said frame having fingers positioned in said slots, said fingers being adapted to abut against the ends of the slots upon retraction of the frame to thus maintain the disk in position on said terminal pivot so that the closure plate alines vertically with the aperture before fitting into and closing the same.

3. In combination, a motor car provided with an aperture at each side of the body thereof, a casing extending inwardly from and communicating with said aperture, said casing being provided with longitudinal guide-ways in the sides thereof, a foldable lazy tongs frame mounted in the casing and adapted to extend through the aperture into signaling position, pivots connecting the levers of said frame together at their centers, the inner terminal pivot extending transversely of said casing and having its ends slidably mounted in said guide-ways to maintain the frame in longitudinal alinement with the casing, an indicator disk carried by the outer terminal pivot and provided with oppositely arranged slots formed concentric to said outer terminal pivot, a closure plate secured to said disk at the outer edge thereof and adapted to close the aperture when the frame is folded within the recess, the outer terminal levers of said frame having fingers positioned in said slots, said fingers being adapted to abut against the ends of the slots upon retraction of the frame to thus maintain the disk in position on said terminal pivot so that the closure plate alines vertically with the aperture before fitting into and closing the same.

4. The combination with a motor car having an aperture in the body thereof, of a casing extending inwardly from and communicating with said aperture, a supporting rack mounted in said casing, electro-magnets positioned in two pairs on said rack, armatures operatably positioned between the magnets of each pair, a lazy tongs frame having the inner terminal levers thereof connected with said armatures, an indicator disk carried by the outer terminal levers of said frame, said magnets being adapted to attract the armatures to thus expand and contract the frame to respectively thrust the indicator out from the casing into signaling position and to retract the same into concealment within the casing, and closure means connected with the frame to close the aperture when said frame is retracted within the casing.

In testimony whereof I have hereunto set my hand at Los Angeles, California, this 4 day of Feb., 1918.

IRVIN W. GRUHL.

Witness:
William N. Kirkby.